Jan. 20, 1959 R. D. VON SEGGERN 2,869,919
UTILITY BODIES FOR VEHICLES AND TAIL GATES THEREFOR
Filed April 29, 1955 2 Sheets-Sheet 2

INVENTOR
ROBERT D. VON SEGGERN

BY
ATTORNEYS

United States Patent Office 2,869,919
Patented Jan. 20, 1959

2,869,919

UTILITY BODIES FOR VEHICLES AND TAIL GATES THEREFOR

Robert D. Von Seggern, Lincoln, Nebr., assignor to Cushman Motor Works, Inc., Lincoln, Nebr., a corporation of Nebraska Application April 29, 1955, Serial No. 504,830

5 Claims. (Cl. 296—24)

The present invention relates to utility bodies for vehicles and tail gates therefor and has for an object to provide a light weight durable body which lends itself to multiple uses simultaneously.

Another object of the present invention is to provide a tail gate for a utility body which may be selectively attached or detached from the body at will and which is provided with a cover to define compartmentation of the utility body when the tail gate is applied to the vehicle utility body.

A still further object of the present invention is to provide a tail gate for a utility body having an upper and lower receptacle which gate has a cover for the lower receptacle removably secured thereto which cover may be removed when it is desired to combine both the upper and lower receptacles into one common receptacle for carrying the same commodity and which cover may be readily reinstalled when it is desired to carry two different commodities which require separation in transit.

A utility body of the character described may be used to carry golf bags and players around a golf course as shown and described in Patent No. 2,822,969. The body may also be employed for transporting personnel, the individuals being seated upon the bottom of the upper receptacle and the open top and open ended lower receptacle accommodating their legs and feet. An example would be transporting guards over a large industrial plant or the like.

The utility body of the present invention may also be employed to transport two non-compatible commodities which must be separated in transit. This is accomplished with the addition of the tail gate and cover for the lower receptacle.

With the foregoing and other objects in view, the invention will be more fully described hereinafter, and will be more particularly pointed out in the claims appended hereto.

In the drawings, wherein like symbols refer to like or corresponding parts throughout the several views:

Figure 4 is a top plan view of the tail gate and lower receptacle cover constructed in accordance with the present invention.

Figure 5 is a front elevational view of the unit of Figure 4.

Figure 6 is a side elevation view of the units of Figures 4 and 5.

Figure 7 is a fragmentary side elevational view taken at an enlarged scale showing the removable mounting between the tail gate and lower receptacle.

Figure 1:
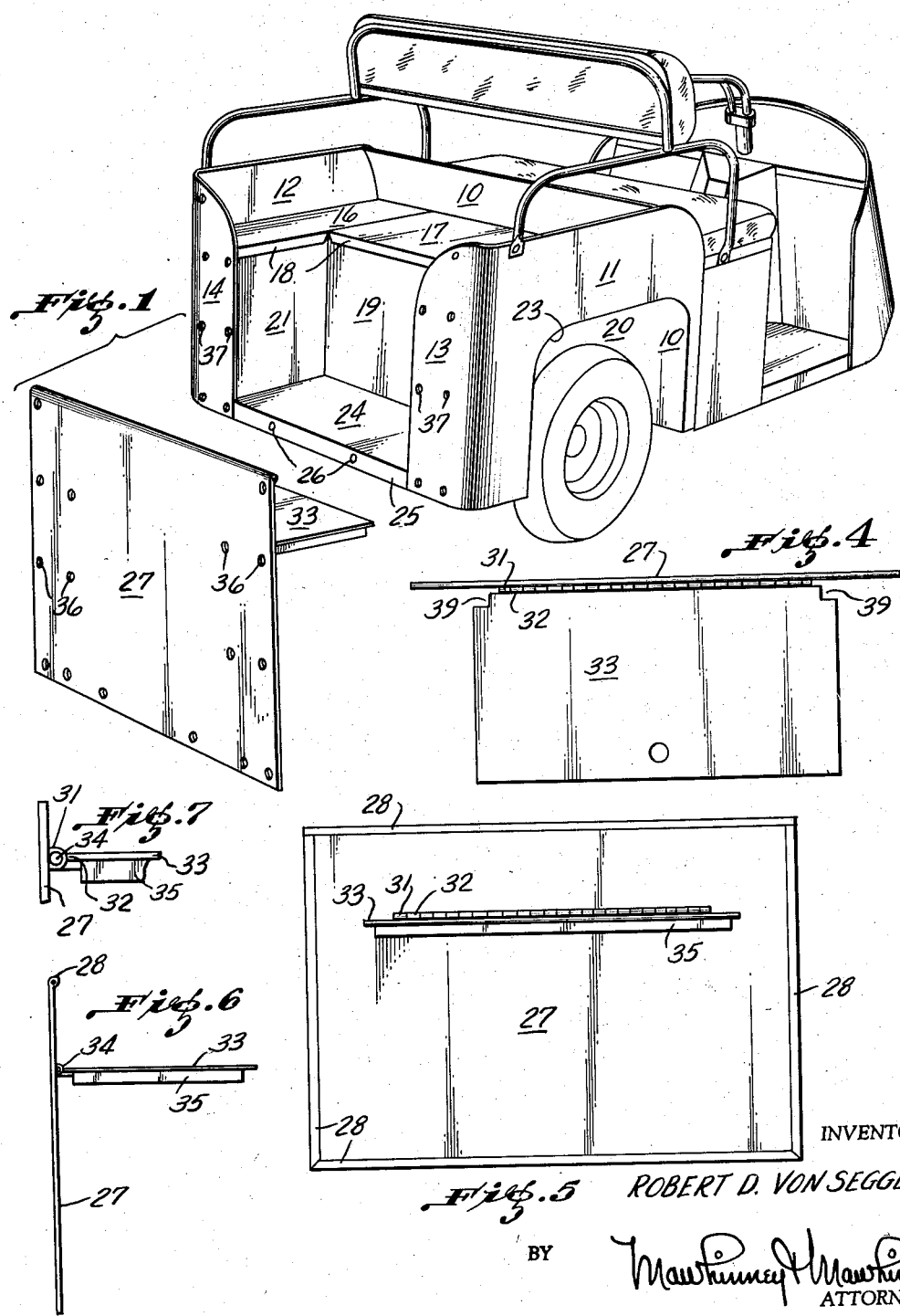
Figure 1 is an exploded rear perspective view of a vehicle having a utility body constructed in accordance with the present invention and being provided with the removable tail gate and cover of the present invention.
Figure 2:
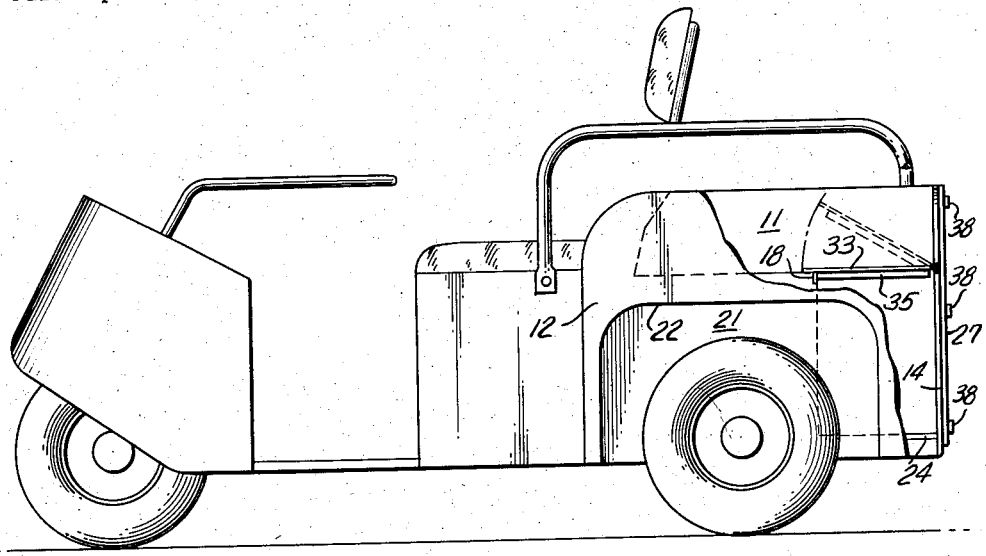
Figure 2 is a side elevational view of a vehicle having the utility body of Figure 1 with cover and tail gate, having parts broken away and parts shown in dotted lines.
Figure 3:
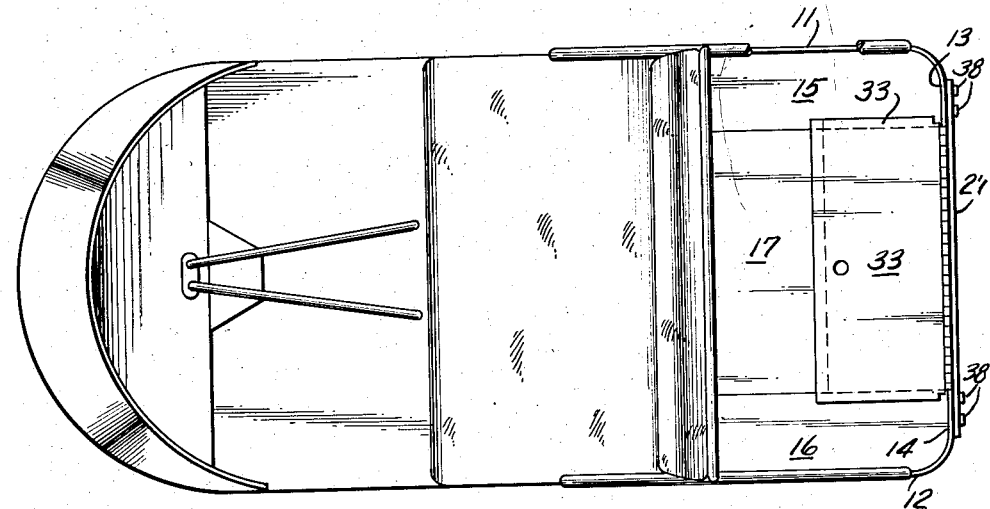
Figure 3 is a top plan view of the vehicle of Figure 2.
Figure 8:
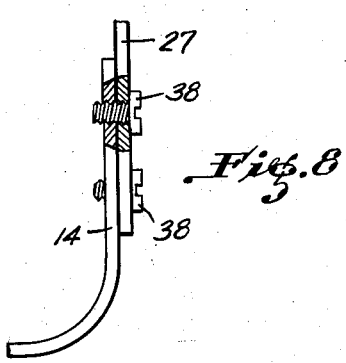
Figure 8 is a fragmentary top plan view taken at an enlarged scale showing the retaining connection between the tail gate and rear of the utility body.

Referring for the moment to Figures 1 through 3 inclusive the utility body may be constructed of a front wall 10 and side walls 11 and 12. The side walls may be curved toward each other at the rear of the body defining partial rear walls 13, 14. Secured at a point below the top of the side walls 11, 12 and lying between the front wall 10 and partial rear walls 13, 14 are two partial bottom members 15, 16 which are welded or otherwise secured to the front, side and partial rear walls. Lying between the members 15, 16 in the same plane and being secured thereto is an intermediate spacer and floor bottom 17. Such construction consisting of the three bottom sections 15, 16 and 17 together with front wall 10, side walls 11 and 12 and partial rear walls 13, 14 defines an upper receptacle having an open top and rear end.

Each of the members 15, 16 and 17 has marginal down turned flanges 18 against which front wall 19, and side walls 20, 21 abut and are joined in a weld. Each of the side walls 20, 21 extends from the partial rear walls 13, 14 to the front wall 10 and defines with the side walls 11 and 12 wheel pockets to receive the rear wheels of the vehicle. The side walls 11 and 12 are cut away at 22, 23 to provide access to the wheels from the sides of the utility body. Secured between the front wall 19, and side walls 20, 21 is a bottom 24 having a down turned rear flange 25 having openings 26 therethrough. The front wall 19, side walls 20, 21 and bottom 24 define the lower receptacle having an open top and rear end.

Referring now to Figure 1 and Figures 4 through 8 inclusive the tail gate may consist of a plate-like member 27 of sheet metal having bent over edges 28 forming strengthening beads about the perimeter of the sheet 27.

A hinge bearing housing 31 is secured to the member 27 which receives complemental hinge bearings 32 carried by a cover 33. The two units of the hinge construction 31 and 32 are joined by a removable hinge pintle 34. The cover 33 is slightly greater in area than the opening defined by flanges 18 of members 15, 16, 17 and plate-like member 27. A stabilizing flange 35 is secured to the bottom of the cover 33 and is inwardly from the perimeter of the cover 33 whereby the flange 35 will snugly engage the flanges 18 of the members 15, 16 and 17 to stabilize the cover 33 to prohibit its bouncing up and down during operation of the vehicle.

The tail gate plate-like member 27 has openings 36 therethrough in registry with openings 37 in the partial rear walls 13, 14 and openings 26 in the flange 25 of bottom 24. All of these openings are adapted to receive self tapping screws 38 or other suitable removable type fasteners which will permit the tail gate 27 to be attached or detached at will.

*In operation*

When it is desired to use the utility body as a bin truck with both the upper and lower receptacles in communication in the form of a single common bin, the hinge pintle 34 is removed by sliding same axially of its mounting. This may be accomplished with the use of a drift punch and hammer, the cutouts 39 in the cover 33 (Figure 4) permitting use of the hammer on one side and permitting access of a pair of pliers on the other side to grip and extract the pintle 34 from the housing 31, 32. The cover 33 is then removed and stored for future use. The tail gate 27 is then placed against the partial rear walls 13, 14 so that its openings 36 come into registry with the openings 37 of the partial rear walls 13, 14 at which time the self tapping screws 38 are set in place with a screwdriver.

When it is desired to use the body for transporting materials which it is desirable to separate, the tail gate 27 with its hingedly attached cover 33 as shown in Figures 4 through 7 is applied to the rear of the body as described hereinabove.

Although I have disclosed herein the best form of the invention known to me at this time, I reserve the right to all such modifications and changes as may come within the scope of the following claims.

What I claim is:

1. A utility body for vehicles comprising front, side and bottom walls defining upper and lower receptacles the top and rear walls of each of which are open, said lower receptacle having a horizontal area less than said upper receptacle, said upper receptacle having a height less than said lower receptacle, a rear tail gate removably secured to the rear of said body to define the rear walls of said upper and lower receptacles, and cover means pivotally connected with said tail gate and complementing the bottom walls of said upper receptacle to define a portion of the bottom of said upper receptacle and the whole of a cover of said lower receptacle.

2. A utility body for vehicles comprising front, side and bottom walls defining upper and lowr receptacles the top and rear walls of each of which are open, a tail gate removably secured to the rear of said body to define a rear wall for said upper and lower receptacles, and horizontally hinged cover means carried by said tail gate overlapping the area of said lower receptacle and resting upon the bottom of said upper receptacle to define a portion of the bottom of said upper receptacle and the whole of a cover for the lower receptacle.

3. A utility body for vehicles comprising front, side and bottom walls defining upper and lower receptacles, the horizontal area of said lower receptacle being less than that of said upper receptacle, a rear tail gate removably secured to the rear of said body to define the rear walls of said upper and lower receptacles, a cover associated with said gate and with the upper and lower receptacles for completing the bottom of said upper receptacle and the top of said lower receptacle, and removable pivot means connected between said gate and cover whereby said cover may be rotated to provide access to said lower receptacle or removed to permit any contents of both receptacles to be intermixed.

4. A tail gate for a utility body having an upper and lower receptacle the top and rear end of each of which is open comprising a rear plate-like member at least co-extensive in height and width with the rear openings of said upper and lower receptacles and being adapted to be removably secured to the rear of said body to define the rear wall of said upper and lower receptacles, cover means for said lower receptacle adapted to be secured at its rear end to said plate-like member and to bear upon a portion of the bottom of said upper receptacle, and removable hinge pin means connected between said cover and plate-like members for pivotally joining said cover to said plate-like member whereby said cover for said lower receptacle may be raised and lowered to separate said upper and lower receptacle or removed to permit intermingling of the contents of both said upper and lower receptacles.

5. For use with a utility body having an upper and lower receptacle, said lower receptacle having a smaller length and width than said upper receptacle and being in communication therewith, both said upper and lower receptacles having an open rear end; a tail gate comprising a plate-like member adapted to be secured to the rear of said utility body and being at least co-extensive in width and height with the rear openings of said upper and lower receptacle to define the rear wall of each receptacle, a cover for said lower receptacle removably secured to said plate-like member and positioned to seat upon the bottom of said upper receptacle, and hinge means connected between said plate-like member and said cover for securing said cover to said plate-like member to permit said cover to be lifted through an arc of substantially 90° to permit access to said lower receptacle when said tail gate is installed.

References Cited in the file of this patent

UNITED STATES PATENTS

| | | |
|---|---|---|
| D. 149,445 | Rose | Apr. 27, 1948 |
| D. 176,272 | Laher | Dec. 6, 1955 |
| 653,182 | Quigley | July 3, 1900 |
| 819,057 | Gerhart | May 1, 1906 |
| 1,886,782 | Bentz | Nov. 8, 1932 |
| 2,504,222 | Otto | Apr. 18, 1950 |